(12) United States Patent
Ayadhi

(10) Patent No.: US 8,091,849 B2
(45) Date of Patent: Jan. 10, 2012

(54) SUSPENSION DEVICE FOR A HARDWARE ELEMENT

(75) Inventor: Sadak Ayadhi, Yvelines (FR)

(73) Assignee: General Electric Company, Schenectady, NY (US)

( * ) Notice: Subject to any disclaimer, the term of this patent is extended or adjusted under 35 U.S.C. 154(b) by 241 days.

(21) Appl. No.: 12/354,811

(22) Filed: Jan. 16, 2009

(65) Prior Publication Data

US 2009/0189050 A1  Jul. 30, 2009

(30) Foreign Application Priority Data

Jan. 25, 2008  (FR) ..................................... 08 50467

(51) Int. Cl.
*A47H 1/10* (2006.01)

(52) U.S. Cl. ........ 248/323; 248/317; 248/327; 248/333; 248/610; 248/589

(58) Field of Classification Search .................. 248/317, 248/323, 327, 333, 610, 589
See application file for complete search history.

(56) References Cited

U.S. PATENT DOCUMENTS

| | | | | |
|---|---|---|---|---|
| 943,299 | A * | 12/1909 | Oorson | 403/71 |
| 1,537,635 | A * | 5/1925 | Wellington | 248/317 |
| 2,147,660 | A * | 2/1939 | Loewus | 248/613 |
| 3,077,328 | A * | 2/1963 | Nelson | 248/317 |
| 3,784,145 | A * | 1/1974 | Lawrie | 248/571 |
| 3,814,023 | A * | 6/1974 | Stantial | 104/94 |
| 4,697,777 | A * | 10/1987 | Yang | 248/343 |
| 5,405,117 | A * | 4/1995 | Davis | 248/333 |
| 5,487,524 | A * | 1/1996 | Bergetz | 248/613 |
| 5,845,886 | A * | 12/1998 | McCormick | 248/200.1 |
| 6,328,270 | B1 * | 12/2001 | Elberbaum | 248/288.31 |
| 6,739,096 | B2 * | 5/2004 | Feldpausch et al. | 52/36.1 |
| 6,896,233 | B2 * | 5/2005 | Kuhn | 248/323 |
| 7,320,454 | B2 * | 1/2008 | Lee et al. | 248/343 |
| 7,621,498 | B2 * | 11/2009 | Tang | 248/343 |
| 7,738,245 | B1 * | 6/2010 | Stifal | 361/679.21 |
| 7,793,907 | B2 * | 9/2010 | Woodward et al. | 248/317 |
| 2003/0233040 | A1 | 12/2003 | Sakaniwa | |
| 2005/0230590 | A1 | 10/2005 | Westbrook | |
| 2005/0242261 | A1 * | 11/2005 | Brahler et al. | 248/326 |
| 2007/0158522 | A1 | 7/2007 | Shahrokhi | |
| 2008/0128574 | A1 * | 6/2008 | Walters et al. | 248/324 |
| 2010/0032544 | A1 * | 2/2010 | Tsakiris | 248/610 |

* cited by examiner

*Primary Examiner* — Nkeisha Smith
(74) *Attorney, Agent, or Firm* — Global Patent Operation; Jonathan E. Thomas

(57) ABSTRACT

A suspension device for a hardware element, which includes a mobile carriage, an arm designed to support the equipment to be suspended, and means for connecting between the arm and the carriage, in which the connection means include damping means in order to damp movement of the arm in relation to the mobile carriage.

7 Claims, 3 Drawing Sheets

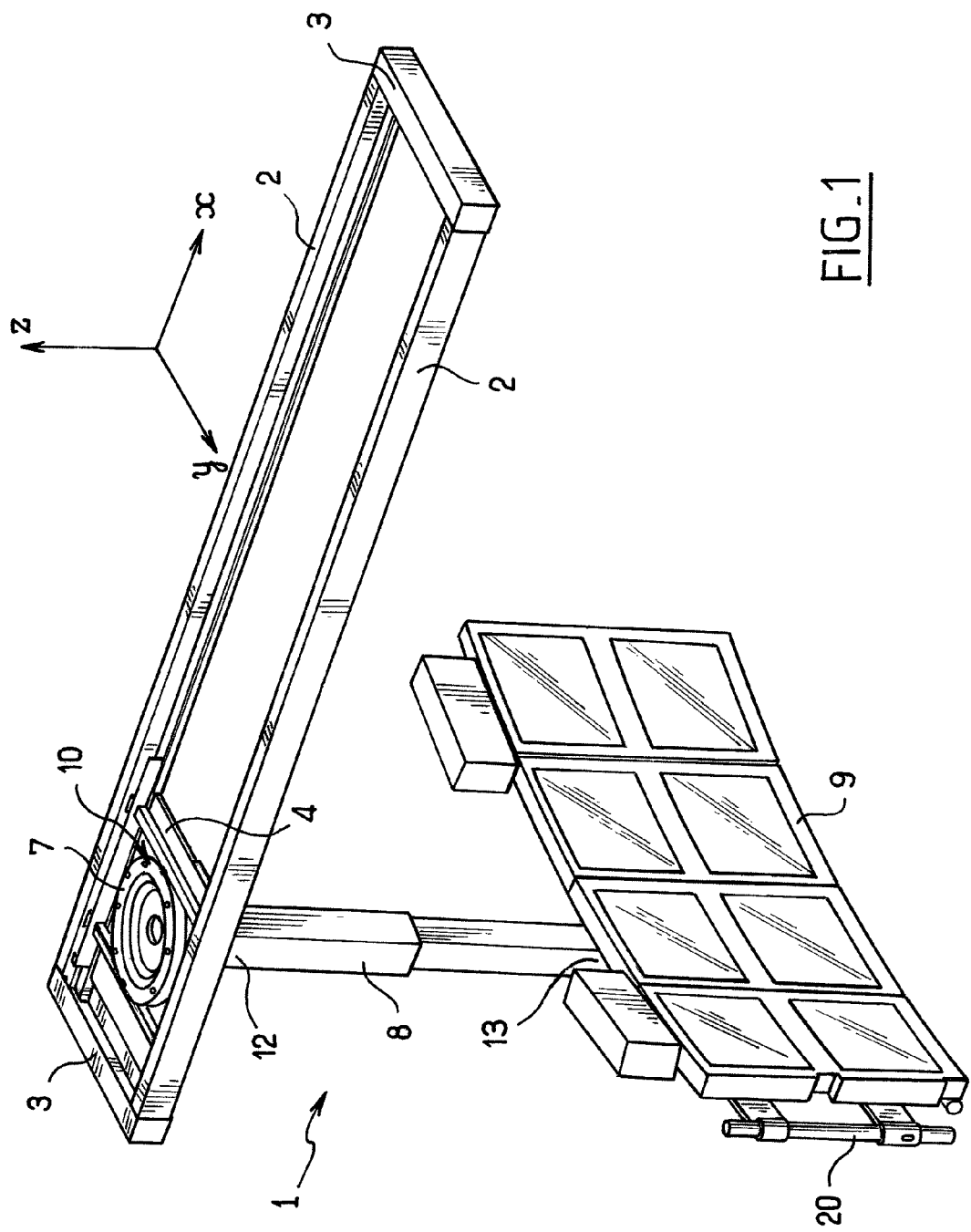
FIG_1

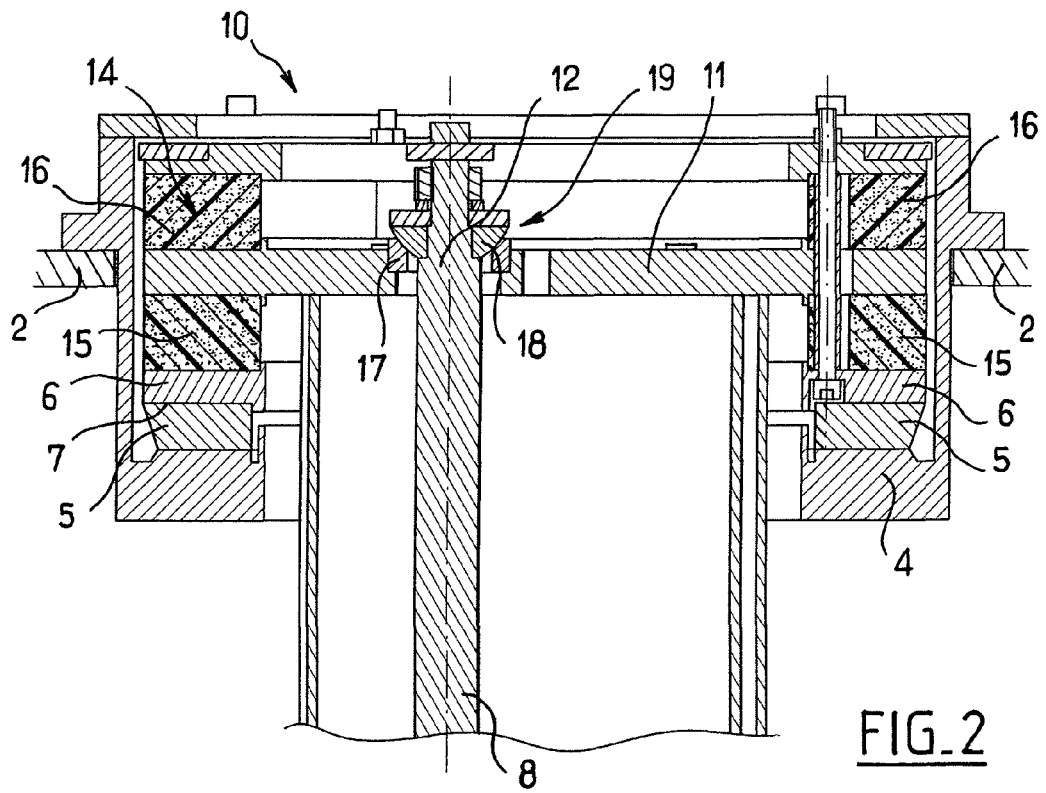
FIG_2
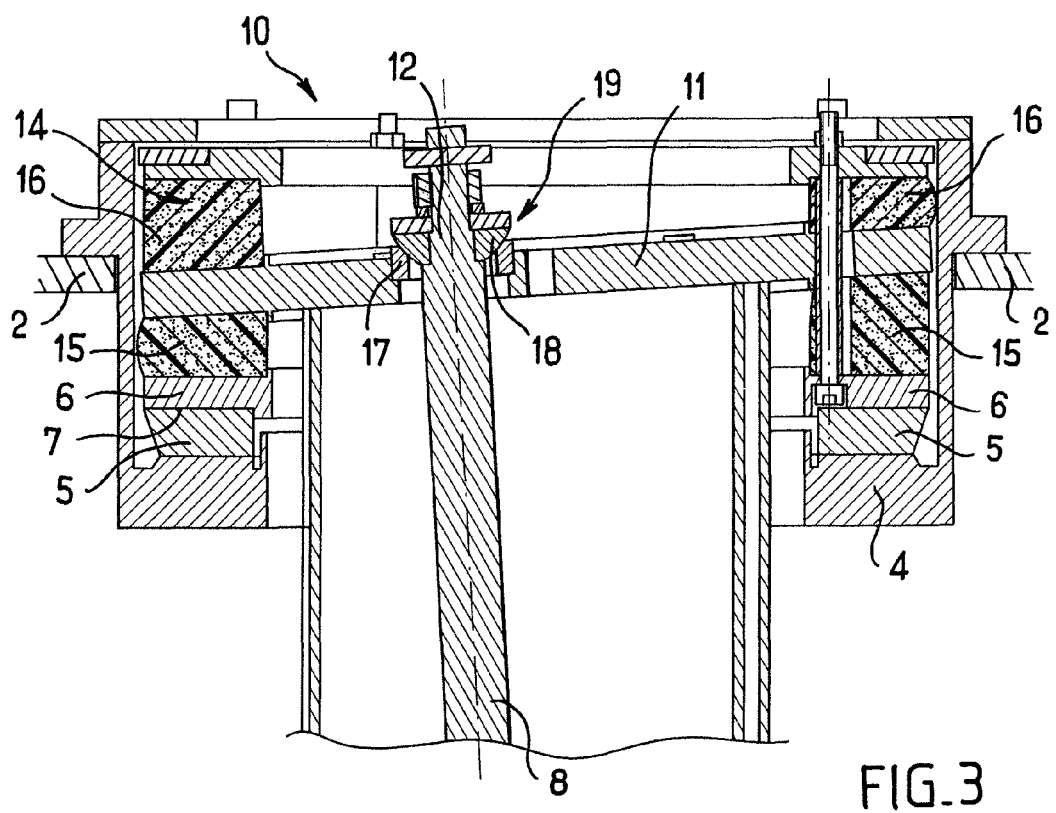
FIG_3

SUSPENSION DEVICE FOR A HARDWARE ELEMENT

CROSS-REFERENCE TO RELATED APPLICATIONS

This application claims priority under 35 U.S.C. §119(a)-(d) or (f) to prior-filed, co-pending French patent application serial number 0850467, filed on Jan. 25, 2008, which is hereby incorporated by reference in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention concerns a suspension device for a hardware element such as a display screen or an assembly that includes several display screens in a medical imaging appliance.

2. Description of Related Art

Some medical imaging appliances include one or more display screens suspended from the ceiling of the operating room by means of a suspension device. The suspended screens allow a surgeon to display the anatomical images, such as vascular images of a patient for example, while performing a surgical operation.

The suspension device generally includes rails fixed to the ceiling, with a mobile carriage capable of sliding horizontally along the rails, and a telescopic arm, one end of which is connected to the carriage and another end is connected to the screens.

The telescopic arm has a variable length that allows adjustment of the height of the screens. To this end, the telescopic arm generally includes a motor-drive device, including a motor and an endless screw, used to vary the length of the arm.

By means of the system of rails and the mobile carriage, an operator is able to move the screens horizontally. To this end, the operator grasps a handle of the device and gives a push to the device so that the mobile carriage slides along the rails. The mobile carriage is stopped in its movement by end-stops placed at the ends of the rails.

However, when the carriage reaches the end-stops, the entire device can be subjected to large stresses. In particular, the shock generated by the entry into contact of the mobile carriage against the end-stops gives rise to bending stresses in the telescopic arm. These stresses are even higher when the arm is located in an extended position and the suspended screens are of significant weight. (The display screens can have a total weight of up to 150 kilograms).

The succession of shocks provoked by repeated operation of the suspension device causes rapid deterioration of the device. In particular, there is a high risk that the telescopic arm will break and that the display screens will fall.

Moreover, the oscillation of the arm that occurs during the movement of the carriage also creates bending stresses in the telescopic arm and is also the cause of damage to the arm.

In order to overcome these drawbacks, one solution that can be envisaged is to increase the size of the component parts of the device, meaning to provide overdimensioned parts so as to limit the risks of damage.

Such a solution is not totally satisfactory however, since it results in the design of a suspension device that is costly and bulky.

BRIEF SUMMARY OF THE INVENTION

One aim of various embodiments of the invention is to limit damage to the suspension device caused by repeated operation of the device.

This problem is addressed by means of a suspension device for a hardware element that includes a mobile carriage, an arm designed to support the equipment to be suspended, and means for connecting between the arm and the carriage, in which the connection means include a shock-absorbing or damping element designed to damp any movement of the arm in relation to the mobile carriage.

The damping element is used to absorb the shocks provoked by the handling of the device. In particular, the damping element limits the generation of bending stresses in the arm of the device.

The device can also exhibit one or more of the following characteristics:
- the damping means include a first damping device with a first block of material absorbing vibration;
- the absorbent material includes an expanded polymer;
- the connection means include a plate to which the arm is connected, with the plate being designed to tilt in relation to the carriage, and the first damping device being arranged to damp a movement of the plate in relation to the carriage;
- the plate is held in contact with the carriage by means of the first block of absorbent material;
- the first damping device includes a second block of material absorbing vibration, with the plate being held in the carriage between the first and second blocks;
- the damping means include a second damping device, with the second damping device being designed to take over from the first damping device to damp the relative movement of the arm in relation to the mobile carriage;
- the arm is mobile in rotation in relation to the plate about at least one axis of rotation, with the axis of rotation being substantially perpendicular to one direction of movement of the mobile carriage, with the second damping device being arranged to damp a movement of the arm in relation to the plate;
- the second damping device includes a ball-and-socket joint connection designed to generate friction forces opposing the movement of the arm in relation to the plate; and
- the arm is mobile in rotation in relation to the carriage about an axis of rotation that is substantially parallel to one direction of the arm.

Embodiments of the invention provide an X-ray imaging device that includes a suspension device as described previously, and an assembly of display screens, with the assembly of display screens being suspended by means of the suspension device.

BRIEF DESCRIPTION OF THE FIGURES

Other characteristics and advantages of embodiments of the invention will emerge more clearly from the description that follows, which is purely illustrative and non-limiting, and which should be read with reference to the following Figures:

FIG. 1 schematically represents, in perspective, a suspension device according to one embodiment of the invention;

FIG. 2 schematically represents, in section, the device of FIG. 1, in a rest position;

FIG. 3 schematically represents, in section, the device of FIG. 1, in the process of a first phase of damping.

DETAILED DESCRIPTION OF THE INVENTION

Figure 4:
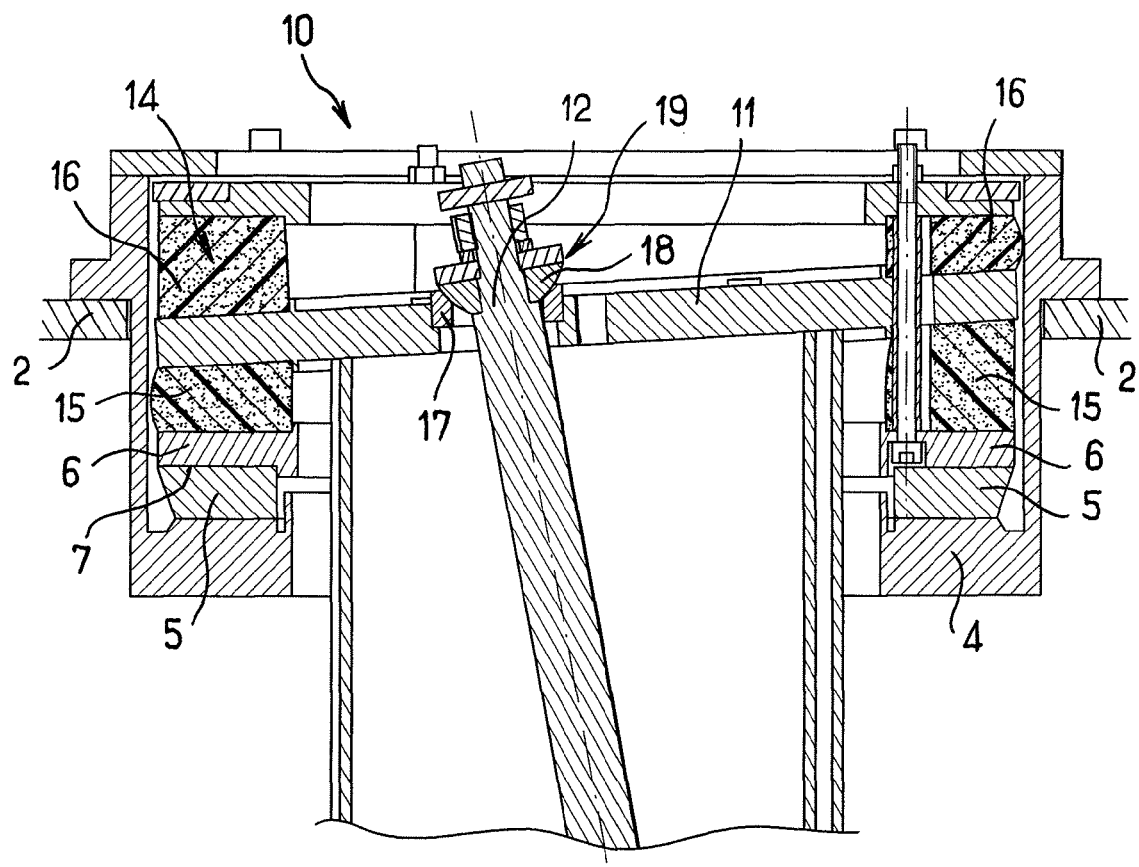
FIG. 4 schematically represents, in section, the device of FIG. 1, in the process of a second phase of damping.

In FIGS. 1 and 2, the suspension device 1 illustrated includes first rails 2 intended to be fixed to the ceiling of an operating room and located in a first generally horizontal direction x. The device also includes second rails (not shown) located in a second generally horizontal direction y, which is perpendicular to the first direction x. The rails 1 are fitted with end-stop elements 3 at each of their ends.

The suspension device 1 also includes a mobile carriage 4 designed to be moved along the rails along directions x and y. The mobile carriage 4 includes a first carriage part 5 resting on the rails, and a second carriage part 6 mounted to rotate in relation to the first carriage part 5 by means of a thrust ball bearing 7. By means of this thrust ball bearing 7, the second carriage part 6 is able to pivot about a generally vertical direction z.

The suspension device 1 also includes a telescopic arm 8 that is intended to support a suspended hardware element 9. In the case in point, the suspended equipment 9 is a matrix of display screens.

The suspension device 1 finally includes a connecting system 10 between the telescopic arm 8 and the mobile carriage 4.

The connecting system 10 firstly includes a plate 11 to which is attached an upper end 12 of the telescopic arm 8, while the lower end 13 of the telescopic arm is attached to the equipment 9.

The connecting system 10 also includes a damping element 14. The plate 11 is held on the second carriage part 6 by means of the damping element 14.

More precisely, the damping element 14 includes two parts, namely a first part 15 fitted below the plate 11, and a second part 16 fitted above the plate 11. The plate 11 is held in contact with the carriage 6 by means of the first part 15.

Each part 15, 16 is formed from a block of general crown shape, the block being composed of a material designed to absorb vibration. The plate 11 is thus held in a sandwich between the two absorbent blocks 15 and 16, with the two blocks themselves being held in the second carriage part 6.

The component material of the blocks 15 and 16 includes an expanded polymer, such as an elastomer polyurethane foam. An example of a particularly appropriate material is Sylomer® marketed in France by Angst and Pfister (Roissy, France).

In addition, the connecting system 10 also includes a first socket part 17 connected to the arm 8 and a second ball part 18 connected to the plate 11 and complementary to the first socket part 17. The two parts 17 and 18 form a ball-and-socket joint 19 by means of which the upper end 12 of the arm 8 is connected to the plate 11. The ball-and-socket joint 19 enables the rotation of the arm 8 along horizontal directions x and y.

In order to move the equipment 9, an operator grasps the equipment 9 (by a handle 20 provided for this purpose for example), and applies a pushing or pulling force in the direction in which is desired to move the equipment.

Under the effect of the force applied by the operator, the mobile carriage 4 slides along the rails. Due to the inertia of the device and of the equipment, the movement of the carriage continues even if the operator releases the handle. When the mobile carriage 4 reaches the end of the rails, the movement of the device is stopped by an end-stop element 3.

The entry into contact of the mobile carriage with the end-stop element 3 provokes an impact that has the effect of stopping the movement of the device. The vibration generated by the impact is transmitted from the carriage to the arm bearing the equipment.

In a first stage (FIG. 3), the energy of the impact and/or of the oscillations is partly absorbed by the damping element 14. In FIG. 3, the damping element that includes the blocks 15 and 16 is designed to deform so as to enable a movement of the plate 11 in relation to the second carriage part 6. (A position of the plate 11 is represented schematically by broken lines in FIG. 2).

In a second stage (FIG. 4), when the energy to be absorbed is greater than a predetermined threshold (which depends on the characteristics of the damping element 14), the arm 8 starts to rotate in relation to the plate 11. As shown in FIG. 4, the first socket part 17 starts to rotate in relation to the second ball part 18 so that the arm 8 is detached from the plate 11.

The energy of the impact is thus successively dissipated by deformation of the damping element 14 (FIG. 3) and then by friction between the socket and ball parts 17 and 18 (FIG. 4).

With such a device, the friction damping in the ball-and-socket joint takes over from the damping by deformation of the damping element.

The device just described has the advantage of limiting the generation of bending stresses in the arm bearing the equipment. In fact, with the device proposed, the arm is driven in traction only. This enables damage to the arm to be limited.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

The invention claimed is:

1. A hardware element suspension device, comprising:
   a mobile carriage;
   an arm configured to support a suspended hardware element; and
   means for connecting the arm to the mobile carriage,
   wherein the means for connecting the arm and the mobile carriage further comprises:
   first means for damping a movement of the arm in relation to the mobile carriage, and second means for damping the movement of the arm with respect to the mobile carriage, wherein the arm is mobile in rotation in relation to the mobile carriage about an axis of rotation, and wherein the axis of rotation is substantially perpendicular to a direction of movement of the mobile carriage, wherein the first means for damping the movement of the arm in relation to the mobile carriage comprises a damping element configured to absorb vibration, wherein the means for connecting the arm to the mobile carriage comprises a plate to which the arm is connected, and wherein the plate is configured to tilt in relation to the mobile carriage and the damping element is configured to damp a movement of the plate in relation to the carriage.

2. The hardware element suspension device of claim 1, wherein the damping element comprises an expanded polymer.

3. The hardware element suspension device of claim 1, wherein the plate contacts the mobile carriage through the damping element having a first part fitted below the plate.

4. The hardware element suspension device of claim 3, wherein the plate contacts the mobile carriage through the damping element having a second part fitted above the plate.

5. The hardware element suspension device of claim 1, wherein the second means for damping the movement of the arm with respect to the mobile carriage is configured to take over from the first means for damping the movement of the arm with respect to the mobile carriage in order to damp a relative movement of the arm in relation to the mobile carriage.

6. The hardware element suspension device of claim 1, wherein the arm is mobile in rotation in relation to the mobile carriage about an axis of rotation, wherein the axis of rotation is substantially perpendicular to a direction of movement of the mobile carriage, and wherein the second means for damping is also configured to damp a movement of the arm in relation to the plate.

7. The hardware element suspension device of claim 6, wherein the second means for damping comprises a ball-and-socket joint connection configured to generate friction forces opposing a movement of the arm in relation to the plate.

* * * * *